United States Patent
Seo et al.

(10) Patent No.: US 11,254,782 B2
(45) Date of Patent: Feb. 22, 2022

(54) BIOMATERIAL-BASED UV COATING COMPOSITION

(71) Applicant: LG HAUSYS, LTD., Seoul (KR)

(72) Inventors: Ji Yeon Seo, Seoul (KR); Heon Jo Kim, Seoul (KR); Jongdae Park, Seoul (KR); Dong Hyung Park, Seoul (KR); Samhun Yun, Seoul (KR); Hyemin Cho, Seoul (KR)

(73) Assignee: LG Hausys, Ltd., Seoul (KR)

( * ) Notice: Subject to any disclaimer, the term of this patent is extended or adjusted under 35 U.S.C. 154(b) by 264 days.

(21) Appl. No.: 16/490,009

(22) PCT Filed: Apr. 19, 2018

(86) PCT No.: PCT/KR2018/004530
§ 371 (c)(1),
(2) Date: Aug. 29, 2019

(87) PCT Pub. No.: WO2018/194383
PCT Pub. Date: Oct. 25, 2018

(65) Prior Publication Data
US 2019/0382616 A1 Dec. 19, 2019

(30) Foreign Application Priority Data
Apr. 21, 2017 (KR) .................. 10-2017-0051609

(51) Int. Cl.
*C09D 175/14* (2006.01)
*C08J 7/04* (2020.01)
*C08G 18/75* (2006.01)
*C08J 7/046* (2020.01)

(52) U.S. Cl.
CPC ........... *C08G 18/755* (2013.01); *C08J 7/046* (2020.01); *C08J 7/0427* (2020.01); *C09D 175/14* (2013.01); *C08J 2327/06* (2013.01); *C08J 2475/14* (2013.01)

(58) Field of Classification Search
None
See application file for complete search history.

(56) References Cited

U.S. PATENT DOCUMENTS

| | | | |
|---|---|---|---|
| 6,346,571 B1 * | 2/2002 | Dharmarajan | C08F 12/04 525/72 |
| 2002/0151615 A1 | 10/2002 | Tortorello et al. | |
| 2015/0005406 A1 | 1/2015 | Ooga et al. | |
| 2018/0000721 A1 * | 1/2018 | SaNogueira | A61K 8/87 |

FOREIGN PATENT DOCUMENTS

| | | |
|---|---|---|
| CN | 101945955 A | 1/2011 |
| CN | 104093761 A | 10/2014 |
| CN | 105001088 A | 10/2015 |
| EP | 0539030 A1 | 4/1993 |
| JP | 7-305002 A | 11/1995 |
| JP | 2003-511531 A | 3/2003 |
| JP | 2005-047952 A | 2/2005 |
| JP | 2005047952 A | 2/2005 |
| JP | 2010-095672 A | 4/2010 |
| JP | 2011-530615 A | 12/2011 |
| JP | 2015-038162 A | 2/2015 |
| JP | 2015-057386 A | 3/2015 |
| JP | 2016222897 A | 12/2016 |
| KR | 1019930013028 A | 7/1993 |
| KR | 100747750 B1 * | 8/2007 |
| KR | 1020110007236 A | 1/2011 |
| KR | 1020120078101 A | 7/2012 |
| KR | 101426140 B1 * | 8/2014 |
| KR | 1020160136502 A | 11/2016 |
| WO | 01/27181 A1 | 4/2001 |
| WO | 2005019363 A1 | 3/2005 |
| WO | WO 2009/134388 A1 * | 11/2009 |
| WO | 2010/015786 A1 | 2/2010 |
| WO | 2010/027673 A1 | 3/2010 |
| WO | 2013/118655 A1 | 8/2013 |
| WO | 2014096818 A1 | 6/2014 |
| WO | 2015/158596 A1 | 10/2015 |
| WO | 2017025380 A1 | 2/2017 |

OTHER PUBLICATIONS 3 page brochure for Rilsan BMNO by Campus (Downloaded on Jul. 13, 2021).*
1 page brochure for Ecobeads D-1 by Daito Kasei Kogyo (Downloaded on Jul. 15, 2021).*

* cited by examiner

*Primary Examiner* — Tae H Yoon
(74) *Attorney, Agent, or Firm* — Dentons US LLP

(57) ABSTRACT

The present invention relates to a UV coating composition, and more particularly, to an environmentally friendly biomaterial-based UV coating composition having physical properties equal or superior to those of conventional petrochemical-based UV coating compositions.

17 Claims, No Drawings

BIOMATERIAL-BASED UV COATING COMPOSITION

CROSS-REFERENCE TO RELATED APPLICATION(S)

This application claims the benefit of priority of Korean Patent Application No. PCT/KR2018/004530 filed on Apr. 19, 2018, and claims priority to and the benefits of Korean Patent Application No. 10-2017-0051609, filed Apr. 21, 2017, the entire contents of which are incorporated herein by reference.

TECHNICAL FIELD

The present invention relates to an ultraviolet light (UV) coating composition, and more particularly, to an environmentally friendly biomaterial-based UV coating composition having physical properties equal or superior to those of conventional petrochemical-based UV coating compositions.

BACKGROUND ART

With recent technological development, to meet increased aesthetic demands of consumers, methods of forming a coating film on the surface of a product are widely used.

In general, coating refers to application of other materials to the surface of an object. Coating serves to protect objects from external stimuli (e.g., scratches), discoloration, and oxidation. In addition, the appearance of an object on which a coating film is formed can be maintained for a long time.

According to a general procedure, after a coating solution is applied to the surface of an object, a curing process is performed. In this case, heat curing methods, light curing methods, or evaporation drying methods may be used. Thereamong, the light curing methods, in particular ultraviolet light (UV) curing methods, are widely used because the light curing methods can reduce environmental pollution by minimizing use of solvents and have high efficiency due to short curing time.

In Korean Patent Application Publication No. 10-1993-0013028, a UV-curable coating composition is disclosed. The UV-curable coating composition is prepared using petrochemicals and contains no biomaterial. Accordingly, use of the composition may cause environmental problems such as depletion of hydrocarbon resources and generation of carbon dioxide and environmental hormones. Therefore, a novel composition that can replace the conventional composition needs to be developed.

RELATED ART DOCUMENTS

[Patent Documents] (Patent Document 1) KR 10-1993-0013028 A (Publication date: Jul. 21, 1993)

DISCLOSURE

Technical Problem

Therefore, the present invention has been made in view of the above problems, and it is one object of the present invention to provide an environmentally friendly UV coating composition having physical properties equal or superior to those of conventional petrochemical-based UV coating compositions.

Technical Solution

In accordance with one aspect of the present invention, provided is a UV coating composition including:
a bio-urethane acrylate oligomer;
a bio-monomer;
a bio-wax; and
a bio-bead.

Advantageous Effects

As apparent from the foregoing, the present invention advantageously provides a biomaterial-based UV coating composition having physical properties equal or superior to those of conventional petrochemical-based UV coating compositions.

According to the present invention, since the UV coating composition of the present invention is prepared based on a biomaterial, the UV coating composition of the present invention is more environmentally friendly than conventional petrochemical-based UV coating compositions.

BEST MODE

Hereinafter, the present invention will be described in detail.

The present invention relates to a UV coating composition including a bio-urethane acrylate oligomer, a bio-monomer, a bio-wax, and a bio-bead.

Hereinafter, each component will be described in detail.

Bio-Urethane Acrylate Oligomer

The bio-urethane acrylate oligomer may be prepared by reacting a bio-based polyol, an isocyanate, and an acrylic monomer.

Bio-based polyols may be classified into polyester polyols and polyether polyols. In the case of polyether polyols, phase separation characteristics and hydrolysis resistance are excellent, but mechanical properties are poor. Thus, in the present invention, a polyester polyol may be used as a specific example of the bio-based polyol. The polyester polyol of the present invention may be prepared through esterification of a bio-based dimer acid and a bio-based diol.

The bio-based dimer acid may be obtained from vegetable oil, and may be a dimer acid obtained by reacting a fatty acid having 1 to 4 ethylenic double bonds and 14 to 22 carbon atoms (hereinafter referred to as "unsaturated fatty acid X"), preferably a fatty acid having 2 ethylenic double bonds and 14 to 22 carbon atoms, and a fatty acid having 1 to 4 ethylenic double bonds and 14 to 22 carbon atoms (hereinafter referred to as "unsaturated fatty acid Y"), preferably a fatty acid having 1 or 2 ethylenic double bonds and 14 to 22 carbon atoms, in the double bonds.

The fatty acid having 2 ethylenic double bonds and to 22 carbon atoms as unsaturated fatty acid X may include tetradecadienoic acid, hexadecadienoic acid, octadecadienoic acid (e.g., linoleic acid), eicosadienoic acid, docosadienoic acid, octadecatrienoic acid (e.g., linolenic acid), eicosatetraenoic acid (e.g., arachidonic acid), and the like. In addition, unsaturated fatty acid Y may include the above-described acids, and the fatty acid having 1 ethylenic double bond and 14 to 22 carbon atoms as unsaturated fatty acid Y may include tetradecenoic acid (e.g., tsuzuic acid), physeteric acid, myristoleic acid, hexadecenoic acid (e.g., palmitoleic acid), octadecenoic acid (e.g., oleic acid, elaidic acid, and vaccenic acid), eicosenoic acid (e.g., gadoleic acid), docosenoic acid (e.g., erucic acid, cetoleic acid, and brassidic acid), and the like.

In the present invention, a dimer of oleic acid or linoleic acid or a dimer of oleic acid and linoleic acid may be used as a specific example of the bio-based dimer acid.

The bio-based diol may be obtained by fermentation of a plant carbon source (e.g., glucose) or by converting dicarboxylic acid, a dicarboxylic acid anhydride, or a cyclic ether obtained by the fermentation into a diol compound through chemical reaction.

For example, the bio-based diol may include ethylene glycol, 1,2-propanediol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, and a dimer diol. In the present invention, 1,3-propanediol extracted from corn is preferably used as a specific example of the bio-based diol.

The content ratio of the bio-based dimer acid to the bio-based diol for preparing the polyester polyol may be 0.1 to 1:2, or 0.5 to 1:2. Outside the above range, the viscosity of the polyester polyol may be increased, leading to deterioration in operability. In addition, the molecular weight of the polyester polyol may be abnormally increased due to gelation during urethane-forming reaction, the molecular weight distribution of the polyester polyol may be abnormally broadened, or the physical properties of the polyester polyol, such as flexibility and elongation, may be degraded. Thus, the content ratio is preferably adjusted within the above range.

In addition, a sum of contents of the bio-based dimer acid and the bio-based diol may be 10 to 90% by weight or 20 to 80% by weight based on the total weight of the bio-urethane acrylate oligomer. When the sum of contents is less than the above range, the contents of the bio-based materials may be reduced, which is undesirable. When the sum of contents exceeds the above range, the physical properties of the final bio-urethane acrylate oligomer may be degraded. Thus, a sum of contents of the bio-based dimer acid and the bio-based diol is preferably adjusted within the above range.

The polyester polyol may have a molecular weight (MW) of 500 to 10,000 g/mol, 1,000 to 8,000 g/mol, or 1,500 to 6,000 g/mol. When the molecular weight is less than the above range, the physical properties of the polyester polyol may be degraded. When the molecular weight exceeds the above range, the viscosity of the polyester polyol may be excessively increased, which makes handing of the polyester polyol difficult. Thus, it is preferable to use a polyester polyol having a molecular weight within the above range.

The polyester polyol may have a molecular weight distribution (PDI) of 1.2 to 4.0, 1.5 to 3.5, or 1.8 to 3.0. When the molecular weight distribution is less than the above range, the economic efficiency of preparation of the polyester polyol may be lowered. When the molecular weight distribution exceeds the above range, the physical properties of the final bio-urethane acrylate oligomer may be degraded. Thus, the molecular weight distribution is preferably adjusted within the above range.

For example, the isocyanate may include aromatic diisocyanates such as 2,4- or 2,6-tolylene diisocyanate, xylylene diisocyanate, 4,4'-diphenylmethane diisocyanate (MDI), para-phenylene diisocyanate, 1,5-naphthalene diisocyanate, and tolidine diisocyanate; aliphatic diisocyanates having aromatic rings such as α,α,α',α'-tetramethylxylylene diisocyanate; aliphatic diisocyanates such as methylene diisocyanate, propylene diisocyanate, lysine diisocyanate, 2,2,4- or 2,4,4-trimethyl-hexamethylene diisocyanate, and 1,6-hexamethylene diisocyanate; and alicyclic diisocyanates such as 1,4-cyclohexane diisocyanate, methylcyclohexane diisocyanate (hydrogenated TDI), 1-isocyanate-3-isocyanatemethyl-3,5,5-trimethylcyclohexane (IPDI), 4,4'-dicyclohexylmethane diisocyanate, and isopropylidenedicyclohexyl-4,4'-diisocyanate. These compounds may be used alone or two or more thereof may be used in combination.

In the present invention, 1-isocyanate-3-isocyanatemethyl-3,5,5-trimethylcyclohexane (IPDI) or 1,6-hexamethylene isocyanate (HDI) having high reactivity and excellent weather resistance may be used as a specific example of the isocyanate.

The molar ratio of the isocyanate to the polyester polyol may be 1,000:1.5 to 7, or 1,000:2 to 6. When the molar ratio is less than the above range, adhesion and physical properties may be poor. When the molar ratio exceeds the above range, curing properties may be degraded. Thus, the molar ratio is preferably adjusted within the above range.

The acrylic monomer may be an acrylic acid or an acrylate monomer.

The acrylate monomer may be an acrylate having hydroxyl groups, such as hydroxyethyl acrylate, hydroxyethyl methacrylate, hydroxypropyl acrylate, hydroxypropyl methacrylate, hydroxybutyl acrylate, hydroxybutyl methacrylate, hydroxypentyl acrylate, hydroxypentyl methacrylate, hydroxyhexyl acrylate, and hydroxyhexyl methacrylate. These may be used alone or in combination.

The molar ratio of the isocyanate to the acrylic monomer may be 1:0.1 to 0.3, or 1:0.1 to 0.2. When the molar ratio is less than the above range, curing properties may be poor. When the molar ratio exceeds the above range, adhesion and physical properties may be degraded. Thus, the molar ratio is preferably adjusted within the above range.

The bio-urethane acrylate oligomer may have a molecular weight (MW) of 1,000 to 50,000 g/mol, 2,000 to 40,000 g/mol, or 3,000 to 30,000 g/mol. When the molecular weight is less than the above range, adhesion and weather resistance may be degraded. When the molecular weight exceeds the above range, weather resistance may be good, but workability may be degraded due to increase in the viscosity of a coating solution. Thus, it is preferable to use the bio-urethane acrylate oligomer having a molecular weight within the above range.

In addition, the bio-urethane acrylate oligomer may be contained in an amount of 20 to 50% by weight or 25 to 40% by weight based on a total weight of the UV coating composition. When the content of the bio-urethane oligomer is less than the above range, leveling of the coating may be poor, resulting in poor adhesion. When the content exceeds the above range, physical properties such as curing properties and light resistance may be degraded. Thus, the content is preferably adjusted within the above range.

Bio-Monomer

The bio-monomer may be a material, e.g., an acrylic monomer, extracted from animals or plants. For example, the acrylic monomer may include 2-hydroxyethyl acrylate, isobornyl acrylate, isobornyl methacrylate, dipentaerythritol hexaacrylate, trimethylpropane triacrylate, 1,6-hexanediol diacrylate, pentaerythritol triacrylate, and tripropylene glycol diacrylate. These may be used alone or in combination.

When monomers other than the bio-monomer are used, environmental pollution may be caused due to generation of volatile or aromatic organic compounds. Thus, the bio-monomer is preferably used.

In addition, the bio-monomer may be contained in an amount of 10 to 30% by weight or 15 to 25% by weight based on a total weight of the UV coating composition.

When the content is less than the above range, the viscosity of paint may be excessively increased, making smoothing difficult.

When the content exceeds the above range, a large amount of unreacted monomers remains after UV curing, resulting in degradation of physical properties. Thus, the content of the bio-monomer is preferably adjusted within the above range.

Bio-Wax

The bio-wax may be a renewable polyamide, such as aliphatic polyamides obtained from lactams or amino acids (e.g., polyamide 11 obtained by polycondensation of 11-aminoundecanoic acid), condensation products of dicarboxylic acids and diamines (e.g., polyamide 10.10, a condensation product of a decanediamine and sebacic acid, and polyamide 10.36, a condensation product of a decanediamine and a fatty acid dimer), or copolyamides obtained by polymerization of various monomers, as mentioned above (e.g., renewable copolyamides including two or more monomers, such as polyamide 11/10.10, polyamide 11/10.36, polyamide 10.10/10.36, and 11-aminoundecane/n-heptyl-11-aminoundecane copolyamide).

In the present invention, polyamide 11, polyamide 10.10, or a mixture thereof, which has a low water absorption rate and thus low deformation during molding, may be used as a specific example of the bio-wax. When polyamide 11 and polyamide 10.10 are mixed, 50 to 99% by weight of polyamide 11 and 1 to 50% by weight of polyamide 10.10 may be used. Within this range, impact resistance, heat resistance, and rigidity may be excellent.

The bio-wax may be contained in an amount of 0.5 to % by weight or 1 to 10% by weight based on a total weight of the UV coating composition. When the content is less than the above range, the quenching effect of the bio-wax may be reduced. When the content exceeds the above range, the viscosity and slip properties may be excessively increased. Thus, the content of the bio-wax is preferably adjusted within the above range.

Bio-Bead

All kinds of bio-based beads known for cosmetics may be used as the bio-bead. For example, spherical cellulose beads, spherical methacrylate beads, poly(lactic acid) beads, and the like may be used. In the present invention, as a specific example of the bio-bead, poly(lactic acid) beads may be used to provide a silky touch.

In addition, the UV coating composition of the present invention may have excellent durability by including the bio-bead.

The bio-bead may be contained in an amount of 0.5 to 15% by weight or 1 to 10% by weight based on a total weight of the UV coating composition. When the content is less than the above range, touch may not be soft. When the content exceeds the above range, the viscosity may be increased, resulting in degradation of coating properties. Thus, the content of the bio-bead is preferably adjusted within the above range.

In addition, the UV coating composition of the present invention may further include a petrochemical-based acrylic monomer and an acrylic oligomer to improve curing density and light resistance.

For example, the acrylic monomer may include one or more selected from methacrylic acid, isobornyl methacrylate, isodecyl methacrylate, hexanediol di(meth)acrylate, N-vinyl formamide, tetraethylene glycol methacrylate, tripropylene glycol methacrylate, neopentyl glycol dimethacrylate, ethoxylated neopentyl glycol dimethacrylate, propoxylated neopentyl glycol dimethacrylate, trimethylolpropane tri(meth)acrylate, ethoxylated trimethylolpropane trimethacrylate, propoxylated trimethylolpropane trimethacrylate, ethoxylates, propoxylated tripropylene glycol dimethacrylate, pentaerythritol trimethacrylate, pentaerythritol tetramethacrylate, tris(2-hydroxyethyl)isocyanate trimethacrylate, and hydroxypropyl acrylate.

Aliphatic urethane acrylates may be used as the acrylic oligomer.

The acrylic monomer may be contained in an amount of 10 to 30% by weight or 15 to 25% by weight based on a total weight of the UV coating composition, and the acrylic oligomer may be contained in an amount of 1 to 20% by weight or 5 to 15% by weight based on a total weight of the UV coating composition. When the content of each of the acrylic monomer and the acrylic oligomer is less than the above range, basic physical properties such as curing density and light resistance may be degraded. When the content of each of the acrylic monomer and the acrylic oligomer exceeds the above range, the composition of the present invention may not be environmentally friendly due to relative decrease in the contents of biomaterials. Thus, the content is preferably adjusted within the above range.

In addition, the UV coating composition of the present invention may additionally include one or more other additives selected from a photoinitiator, a dispersant, a leveling agent, an antifoamer, and a quencher.

The photoinitiator is a material that absorbs energy from an ultraviolet light source and initiates polymerization when added to UV resins. Conventional polymerization initiators activated by ultraviolet light may be used as the photoinitiator. Examples of the polymerization initiators may include benzophenone-based compounds, benzoin, benzoin ether-based compounds, benzyl ketal-based compounds, acetophenone-based compounds, anthraquinone-based compounds, thioxanthone-based compounds, and the like. These compounds may be used alone or in combination, without being limited thereto. Examples of commercially available polymerization initiators include Irgacure 184™, 754™, and 819™ and Darocur 1173™ and TPO™ (Ciba-Geigy Co.); and Micure CP-4™, MP-8™, BP™, and TPO™ (Miwon Co.). Thereamong, one or more products may be used as the polymerization initiator, without being limited thereto.

The dispersant is added to increase dispersibility. Examples of the dispersant may include DISPERBYK-108, -109, -110, -111, and -180 and ANTI-TERRA-U (BYK Co.); and AFCONA 4047 and TEGODISPERS-710 (AFCONA Co.). These products may be used alone or in combination.

The leveling agent may affect the appearance, wear resistance, and scratch resistance of a coating film, and may include phosphate acrylates (an acid value of 250), polyether siloxane compounds, and fluoroalkyl compounds. In addition, commercially available products such as TEGO Glide 405™, 410™, 432™, 435™, 440™, and 450™, ZG400™, TEGO FLOW 300™ and 370™, TEGO RAD 2100™, 2200N™, 2250™, and 2300™, BYK-UV3500™ and 3510™, and ZONYL 8857™ an 8867™ may be used as the leveling agent, without being limited thereto.

The antifoamer is used to eliminate bubbles generated during roll coating operation, and may include TEGO™, Airex 920™, 932™, 936™, 955™, and 986™, BYK 088™ and 1790™, and AFCONA 2020™, 2021™, 2720™, 2725™ and 2038 ™, without being limited thereto.

The quencher may be a silica-based quencher, without being limited thereto.

The content of the other additives may be determined within a range that does not affect the physical properties of the UV coating composition. In addition to the additives, additives required by those skilled in the art may be further included.

According to the present invention, the UV coating composition may be used to form a coating layer on a base material.

For example, the base material may be a polyvinyl chloride (PVC) film or a polycarbonate (PC) film.

The coating layer may be formed in a single-layer or multilayer form, and the thickness of the coating layer may be 2 to 40 μm or 3 to 30 μm. When the thickness of the coating layer is less than the above range, physical properties may be degraded. When the thickness of the coating layer exceeds the above range, the thickness of the coating layer may be excessively increased, thereby lowering curing properties. Thus, the thickness of the coating layer is preferably adjusted within the above range.

When coating is performed using the UV coating composition of the present invention, a gravure, a sponge, or an air knife may be used, but the present invention is not limited thereto.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

Example 1

Preparation of Bio-Urethane Acrylate Oligomer 5 g of dilinoleic acid dimer (PRIPOL, Croda Co.) prepared by polymerizing two molecules of linoleic acid, a plant-based unsaturated fatty acid, as a bio-based dimer acid, and 10 g of 1,3-propane diol (Susterra®, Dupont Co.) obtained by fermenting plant-based glucose and purifying the fermentation product, as a bio-based diol, were added to a reactor, and then polymerization was performed at 150° C. while distilling off water generated during the reaction to prepare a bio-based polyester polyol having a molecular weight of 2,000 to 5,000 g/mol. 10 g of the prepared polyester polyol were reacted with 20 g of isocyanate (IPDI) and 10 g of acrylic acid to prepare a bio-based urethane acrylate oligomer having a molecular weight of 4,000 to 20,000 g/mol.

Example 2

Preparation of UV Coating Composition

UV coating compositions according to an example or a comparative example were prepared using the compositions shown in Table 1 below.

When the UV coating composition according to this example was prepared, the bio-urethane acrylate oligomer prepared in Example 1 was used.

TABLE 1

| Classification | | Example (% by weight) | Comparative example (% by weight) |
|---|---|---|---|
| Bio-urethane acrylate oligomer | | 30 | — |
| Bio-monomer (Sarbio 5201, Arkema Co.) | | 20 | — |
| Bio-bead (Ecobeads, Daito Kasei Co.) | | 5 | — |

TABLE 1-continued

| Classification | | Example (% by weight) | Comparative example (% by weight) |
|---|---|---|---|
| Bio-wax (Rilsan, Arkema Co.) | | 5 | — |
| Acrylic oligomers | (PU340, Miwon Co.) | — | 20 |
| | (PU2100, Miwon Co.) | 10 | 20 |
| Acrylic monomers | Hydroxypropyl acrylate (HPA) | 15 | 30 |
| | Hexanediol diacrylate (HDDA) | 5 | 10 |
| | Trimethylolpropane triacrylate (TMPTA) | — | 10 |
| Additives | Photoinitiator | 2 | 2 |
| | Dispersant | 0.5 | 0.5 |
| | Leveling agent | 1 | 1 |
| | Antifoamer | 0.5 | 0.5 |
| | Quencher | 6 | 6 |

Example 3

Measurement of Physical Properties of UV Coating Compositions

Experimental Example 1

The viscosity (or workability) of UV coating compositions according to the example or the comparative example prepared using the mixing ratios shown in Table 1 and the physical properties of coating films prepared using the UV coating compositions were measured as follows.

[Gloss]

A PVC film was coated with the UV coating composition to a thickness of 10 to 20 μm, pre-curing of the coated PVC film was performed at 150 to 200 mJ under an oxygen atmosphere using an Hg lamp, and complete curing of the coated PVC film was performed at 500 mJ under a nitrogen atmosphere using an Hg lamp. Then, gloss was evaluated using a gloss meter (60 Gloss-Meter).

[Curing Properties]

A PVC film was coated with the UV coating composition to a thickness of 10 to 20 μm, and a PET film was laminated thereon. Then, pre-curing of the film was performed at 150 to 200 mJ under an oxygen atmosphere using an Hg lamp, and complete curing of the film was performed at 500 mJ under a nitrogen atmosphere using an Hg lamp. After curing, the curing properties of the film were evaluated by measuring solvent resistance using methyl ethyl ketone (MEK).

[Adhesion]

A PVC film was coated with the UV coating composition to a thickness of 10 to 20 μm, pre-curing of the coated PVC film was performed at 150 to 200 mJ under an oxygen atmosphere using an Hg lamp, and complete curing of the coated PVC film was performed at 500 mJ under a nitrogen atmosphere using an Hg lamp. Then, a cross-cutting test was performed on the cured coating film using glass tape. The film or layer formed on the specimen was cut to form 100 checkered sections of 1 mm×1 mm size, and glass tape was attached to the sections. Then, adhesion was evaluated by measuring the number of sections separated from the specimen when the glass tape was peeled off.

[Pollution Resistance]

A PVC film was coated with the UV coating composition to a thickness of 10 to 20 μm, pre-curing of the coated PVC film was performed at 150 to 200 mJ under an oxygen atmosphere using an Hg lamp, and complete curing of the coated PVC film was performed at 500 mJ under a nitrogen atmosphere using an Hg lamp. Thereafter, the film was stained using an oil pen, and after 30 seconds, the stain was wiped off with a dry cloth. Then, the degree of stain removal was evaluated by visual observation.

[Solvent Resistance]

A PVC film was coated with the UV coating composition to a thickness of 10 to 20 μm, pre-curing of the coated PVC film was performed at 150 to 200 mJ under an oxygen atmosphere using an Hg lamp, and complete curing of the coated PVC film was performed at 500 mJ under a nitrogen atmosphere using an Hg lamp. Thereafter, methyl ethyl ketone (MEK) was absorbed into a gauze, and the specimen on which the coating film is formed was rubbed 20 times with the gauze while applying constant force. Then, solvent resistance was evaluated by visually determining whether haze changed.

[Steam Resistance]

A PVC film was coated with the UV coating composition to a thickness of 10 to 20 μm, pre-curing of the coated PVC film was performed at 150 to 200 mJ under an oxygen atmosphere using an Hg lamp, and complete curing of the coated PVC film was performed at 500 mJ under a nitrogen atmosphere using an Hg lamp. Then, a Han Kyung Hee steam cleaner was placed on the UV-cured coating film for 20 minutes (1 cycle), and UV cracking was judged.

[Workability]

Viscosity was measured at room temperature (25° C.) and at 30 rpm using a viscometer (Brookfield DV-I prime, USA) with Spindle 64. Based on the measured viscosity, workability was evaluated.

[Odor]

According to a sensory test of odor process tests, a panel was composed of three males and two females, and the panel smelled the coated films to evaluate the degree of odor. The results are shown in Table 2 below. Here, the levels of odor are divided into 7 levels from level 0 to level 6. The number of levels is proportional to the degree of odor.

TABLE 2

| Odor level | Odor expression |
|---|---|
| 0 | No odor |
| 1 | Difficult to distinguish type of odor, but there is slight odor. |
| 2 | Possible to roughly distinguish type of odor. |
| 3 | Possible to clearly distinguish type of odor. |
| 4 | Easy to sense odor. |
| 5 | Odor is severe enough to cause disgust or discomfort. |
| 6 | Unbearably strong odor |

The results of evaluation on gloss, curing properties, adhesion, pollution resistance, solvent resistance, steam resistance, workability, and odor are shown in Table 3 below.

TABLE 3

|  | Example | Comparative example | Criteria |
|---|---|---|---|
| Gloss | 10 to 12 | 10 to 12 | 10 to 12 |
| Curing properties | Good | Good | Good |
| Adhesion | 0 | 0 | 1 or more (poor) |
| Pollution resistance | Good | Good | Good |
| Solvent resistance | Good | Good | Good |
| Steam resistance | Good | Poor | Good |
| Workability (viscosity) | Good (450 cP) | Good (400 cP) | Good (350 to 450 cP) |
| Odor | 1 | 2 to 3 | 2 or less |

As shown in Table 3, the gloss, curing properties, adhesion, pollution resistance, solvent resistance, and workability of the UV coating composition of the example are equal to those of the UV coating composition of the comparative example, and the steam resistance of the UV coating composition of the example is superior to that of the UV coating composition of the comparative example. In addition, compared with the comparative example, the composition of the example has a low degree of odor.

Experimental Example 2

In Table 4 below, the discharge amount of total volatile organic compounds (TVOCs), toluene, and formaldehyde is shown, and the example and the comparative example are compared.

TABLE 4

| | | Test results | | | |
|---|---|---|---|---|---|
| Test items | Units | Example | Comparative example | Criteria | Test methods |
| TVOCs | mg/m$^2$·h | 0.096 | 0.123 | 0.1 or less | Indoor Air Quality |
| Toluene | mg/m$^2$·h | 0.004 | 0.004 | 0.005 or less | Process Test Criteria |
| Formaldehyde | mg/m$^2$·h | 0.001 | 0.002 | 0.001 or less | (Ministry of Environment Notice No. 2010-24) |

As shown in Table 4, according to Indoor Air Quality Process Test Criteria (Ministry of Environment Notice No. 2010-24), when the UV coating composition of the present invention and the conventional UV coating composition are compared in terms of the discharge amount of TVOCs, toluene, and formaldehyde, the discharge amount of TVOCs, toluene, and formaldehyde in the UV coating composition of the present invention is significantly less than that in the conventional UV coating composition. Based on these results, it can be confirmed that the UV coating composition of the present invention is environmentally friendly.

The invention claimed is:

1. A UV coating composition, compassing consisting of:
an acrylate oligomer consisting of a bio-urethane acrylate oligomer and a petrochemical-based acrylate oligomer;
an acrylic monomer consisting of a bio-monomer and a petrochemical-based acrylic monomer;
a bio-wax; and
a bio-bead, and
additives consisting of a photoinitiator, a dispersant, a leveling agent, an antifoamer, and a quencher;
wherein the bio-urethane acrylate oligomer is an isocyanate based polyester polyol having a molecular weight of 4,000 to 20,000 g/mol,
wherein the isocyanate based polyester polyol is an esterification reaction product of a bio-based dimer acid and a bio based diol,
wherein a content ratio of the bio-based dimer acid to the bio-based diol is 0.1 to 1:2,
wherein the bio-wax is a mixture of 50 to 99% by weight of polyamide 11 and 1 to 50% by weight of polyamide 10.10.

2. The UV coating composition according to claim 1, wherein the bio-urethane acrylate oligomer is prepared by reacting a bio-based polyol, an isocyanate, and an acrylic monomer.

3. The UV coating composition according to claim 1, wherein the bio-based diol is one ore more selected from ethylene glycol, 1,2-propanediol, 1,3-propanediol, 1,3-butanediol, 1-4-butanediol, 1,5-pentanediol, 1,6-hexanediol, neopentyl glycol, diethylene glycol, triethylene glycol, tetraethylene glycol, dipropylene glycol, tripropylene glycol, and a dimer diol.

4. The UV coating composition according to claim 2, wherein the isocyanate comprises one or more selected from aromatic diisocyanates, aliphatic diisocyanates having aromatic rings, aliphatic diisocyanates, and alicyclic diisocyanates.

5. The UV coating composition according to claim 1, wherein a molar ratio of the isocyanate to the polyester polyol is 1,000:1.5 to 7.

6. The UV coating composition according to claim 1, wherein the acrylic monomer is an acrylic acid or an acrylate monomer.

7. The UV coating composition according to claim 1, wherein a molar ratio of the isocyanate to the acrylic monomer is 1:0.1 to 0.3.

8. The UV coating composition according to claim 1, wherein the bio-urethane acrylate oligomer is contained in an amount of 20 to 50% by weight based on a total weight of the UV coating composition.

9. The UV coating composition according to claim 1, wherein the bio-monomer is an acrylic monomer extracted from animals or plants,
wherein the bio-monomer is contained in an amount of 10 to 30% by weight based on a total weight of the UV coating composition.

10. The UV coating composition according to claim 9, wherein the bio-monomer comprises one or more selected from 2-hydroxyethyl acrylate, isobornyl acrylate, isobornyl methacrylate, dipentaerythritol hexaacrylate, trimethylpropane triacrylate, 1,6-hexanediol diacrylate, pentaerythritol triacrylate, and tripropylene glycol diacrylate.

11. The UV coating composition according to claim 1,
wherein the bio-wax is contained in an amount of 0.5 to 15% by weight based on a total weight of the UV coating composition.

12. The UV coating composition according to claim 1, wherein the bio-bead is a poly(lactic acid) bead,
wherein the bio-bead is contained in an amount of 0.5 to 15% by weight based on a total weight of the UV coating composition.

13. The UV coating composition according to claim 1, wherein the acrylic monomer is contained in an amount of 10 to 30% by weight based on a total weight of the UV coating composition.

14. The UV coating composition according to claim 1, wherein the acrylic oligomer is contained in an amount of 1 to 20% by weight based on a total weight of the UV coating composition.

15. A base material, comprising:
a coating layer,
wherein the coating layer is formed of the UV coating composition according to claim 1, which is prepared by pre-curing the UV coating composition under $O_2$ atmosphere and full-curing the pre-cured UV coating composition under $N_2$ atmosphere.

16. The base material according to claim 15, wherein the base material is a PVC film or a PC film.

17. The base material according to claim 15, wherein the coating layer has a thickness of 2 to 40 μm.

* * * * *